Aug. 31, 1965  R. L. ALLEN  3,203,409
APPARATUS FOR CONTROLLING THE AIR TAKEN INTO THE COMBUSTION
CHAMBERS OF A SPARK IGNITION INTERNAL COMBUSTION ENGINE
Filed July 9, 1963  2 Sheets-Sheet 1
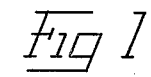
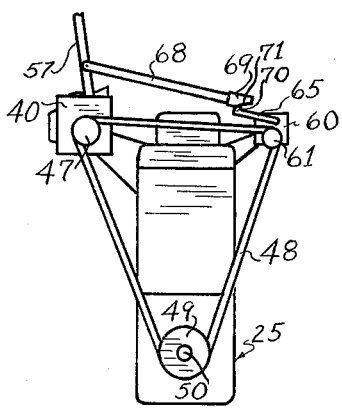
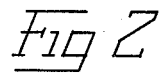
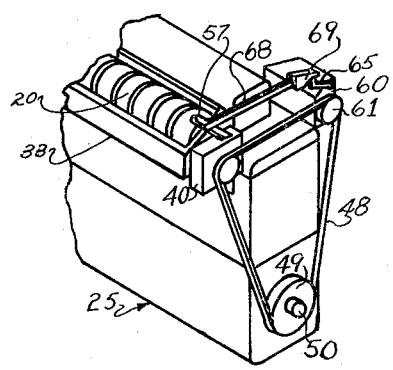
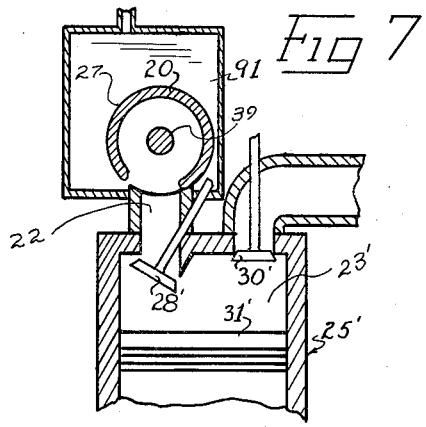
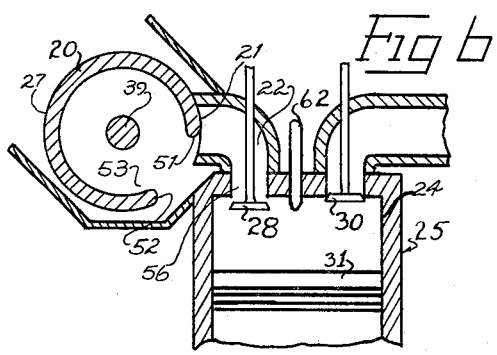
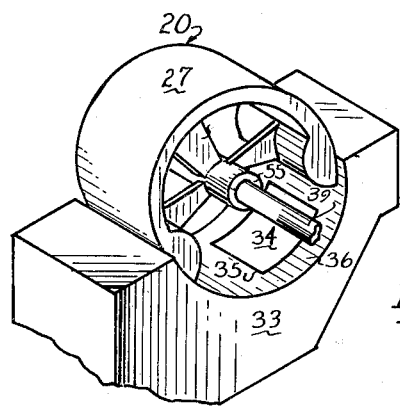
INVENTOR.
Robert L. Allen
BY
Newton, Hopkins & Jones
ATTORNEYS Aug. 31, 1965 R. L. ALLEN 3,203,409
APPARATUS FOR CONTROLLING THE AIR TAKEN INTO THE COMBUSTION
CHAMBERS OF A SPARK IGNITION INTERNAL COMBUSTION ENGINE
Filed July 9, 1963 2 Sheets-Sheet 2
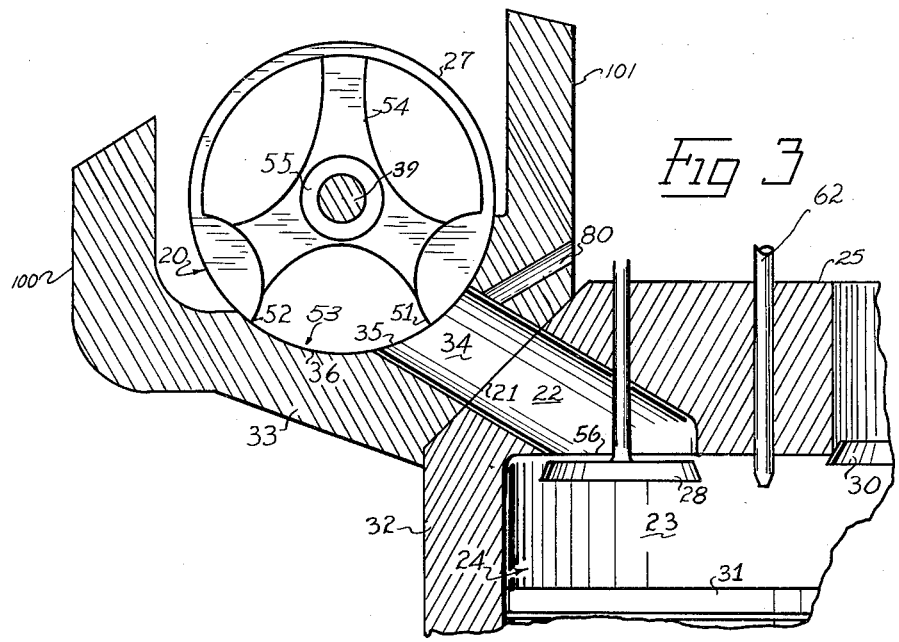
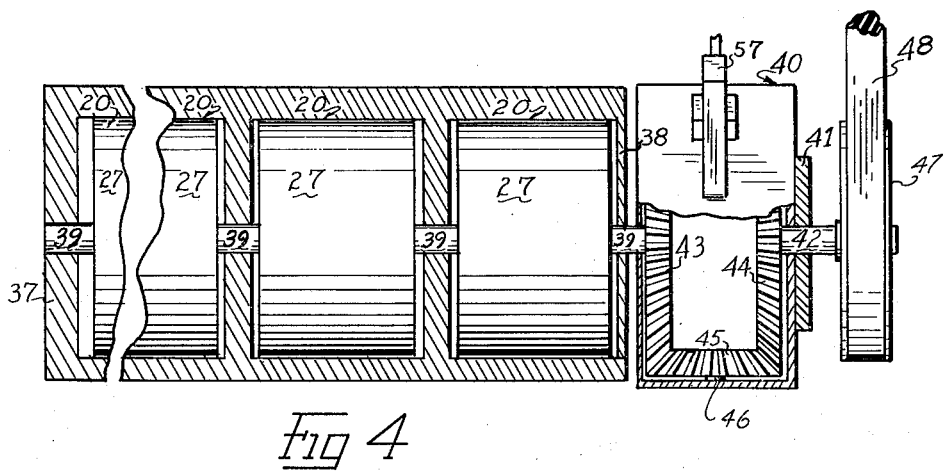
INVENTOR.
Robert L. Allen
BY
Newton, Hopkins & Jones
ATTORNEYS United States Patent Office 3,203,409
Patented Aug. 31, 1965

3,203,409
APPARATUS FOR CONTROLLING THE AIR TAKEN INTO THE COMBUSTION CHAMBERS OF A SPARK IGNITION INTERNAL COMBUSTION ENGINE
Robert L. Allen, Atlanta, Ga., assignor to Georgia Tech Research Institute, Atlanta, Ga., a corporation of Georgia
Filed July 9, 1963, Ser. No. 293,720
7 Claims. (Cl. 123—75)

This invention relates to apparatus for controlling the combustible mixture used by an internal combustion engine, and more particularly to apparatus for controlling the air taken into the combustion chambers of a spark ignition internal combustion engine, such as an Otto or four-stroke cycle engine.

The four strokes of each piston of an Otto or four-stroke cycle engine are the intake, compression, power and exhaust strokes. Engines of this type operate on a combustible mixture of air and a hydrocarbon fuel and the air and fuel are separately injected into each cylinder of the engine during the intake stroke of the piston. The combustible mixture of air and fuel is ignited by a spark plug located in the combustion chamber and for the engine to operate properly, the ratio of air to fuel in the combustible mixture must be maintained within relatively narrow limits. The quantity of the combustible mixture required for each four stroke cycle decreases as the power demands placed upon the engine decrease from full power and as a result, both the quantity of fuel and the quantity of air taken separately into each cylinder of the engine must decrease as the power demands upon the engine decrease in order to maintain the ratio of air to fuel within the required relatively narrow limits.

The quantiy of fuel injected into each cylinder of a four stroke cycle engine is cusomarily controlled by varying the output of a carburetor or fuel injection system and the usual method of independently decreasing the quantity of air as the quantity of fuel decreases with reduced power demands is to reduce the pressure in the intake manifold by throttling. However, the use of throttling apparatus to reduce the quantity of air for less than full power is known to result in pumping losses which reduce engine efficiency. This is because the reduction of intake manifold pressure by reducing the size of the orifice through which air enters the intake manifold increases the engine power which must be used to draw air into the cylinders of the engine and which is lost as useful power output of the engine.

The apparatus disclosed herein completely eliminates this and other difficulties with previous types of apparatus used to vary the air intake of each cylinder of a four stroke cycle engine as the power requirements on the engine vary. The apparatus has a plurality of rotary valves which open and close the air inlet passages of the cylinders of the engine. Each rotary valve permits air to enter a cylinder through an orifice of substantially constant size regardless of the quantity of air required. The quantity of air taken into each cylinder is varied by changing the period of piston motion that the orifice is open rather than by changing the size of the orifice. Thus, the pumping losses resulting from reduced manifold pressure caused by throttling and the reduction of orifice size are eliminated.

The rotary valve associated with each of the cylinders of a four stroke cycle engine cooperates with the air intake valve customarily associated with each cylinder of a four stroke cycle engine to insure that each cylinder of the engine receives the proper quantity of air for the operating conditions of the engine and that air enters the cylinders under substantially the same pressure regardless of quantity. The apparatus of the invention is equally suited to the control of air entering a cylinder into which fuel is independently injected and to the control of a combustible mixture mixed prior to injection into each cylinder of the engine.

These and other features and advantages of the invention will be more clearly understood from the following detailed description and the accompanying drawings in which like characters of reference designate corresponding parts in all figures and in which:

FIG. 1 is a schematic presentation of a four stroke cycle engine showing the air control apparatus used in combination with a fuel injection system of known type.

FIG. 2 is a fragmentary perspective schematic presentation of the engine, air control apparatus, and fuel injection system shown in FIG. 1.

FIG. 3 is a fragmentary sectional view of one embodiment of the air control apparatus taken in a plane between two adjacent rotary valves and perpendicular to the valve axle and shows the relationship of the air control apparatus to the air inlet passage and the air intake valve of a cylinder.

FIG. 4 is a top plan view partially in section and partially cut away of the embodiment of the air control apparatus shown in FIGURE 3.

FIG. 5 is a perspective fragmentary view of a rotary valve of the air control apparatus and shows the relationship of the rotary valve to the extension port of an extension passage leading to a cylinder in a four stroke cycle engine.

FIG. 6 is a schematic sectional view of the air control apparatus used to control the intake of air into the combustion chamber of a four stroke cycle engine into which fuel is injected by a fuel injection system of known type.

FIG. 7 is a schematic sectional view showing the air control apparatus used to control the intake of a combustible mixture of air and fuel into the combustion chamber of a four stroke cycle engine.

These figures and the following detailed description disclose a preferred specific embodiment of the invention, but the invention is not limited to the details disclosed since it may be embodied in other equivalent forms.

This invention is best understood as comprising a plurality of rotary valves 20, each rotary valve 20 being positioned adjacent to the exterior entry port 21 of an air inlet passage 22 leading to the combustion chamber 23 of each of the plurality of cylinders 24 of a four stroke cycle engine 25. Each rotary valve 20 is essentially a partial cylinder concentric and rotatable with an axle 39 extending through all of the plurality of rotary valves 20. When a rotary valve 20 is in a rotational position which places its exterior surface 27 over the exterior entry port 21 of an air inlet passage 22, the rotary valve 20 closes the exterior entry port 21 and prevents the entry of air into the air inlet passage 22. When a rotary valve 20 is in that rotational position which does not place its exterior surface 27 adjacent to the exterior entry port 21 of an air inlet passage 22, the rotary valve 20 opens the exterior entry port 21 and permits air to enter the air inlet passage 22.

An air intake valve 28 opens and closes the air inlet port 56 of an air inlet passage 22 in response to engine 25 revolutions. The construction and operation of the air intake valve 28 and of the exhaust valve 30 customarily associated with cylinder 24 of a four stroke cycle engine 25 is well understood. It is the air intake valve 28 operating in its understood manner and the rotary valve 20 associated with each cylinder 24 of an engine 25 which togeher control the entry of air into the combustion chamber 23 of each cylinder 24 of an engine 25.

The rotary valve 20 and the air intake valve 28 associated with a particular air inlet passage 22 must both be in open position for air to pass through the air inlet passage 22 into the combustion chamber 23 of a cylinder 24. If either the rotary valve 20 or the air intake valve 28 is in closed position, air will not pass through the air inlet passage 22 into the combustion chamber 23. Thus, the quantity of air which enters the combustion chamber 23 of a cylinder 24 during the intake stroke of the piston 31 in the cylinder 24 is dependent upon the rotational position of the rotary valve 20 as the air intake valve 28 opens and closes the air inlet port 56 in the usual understood manner.

However, regardless of the rotational position of the rotary valve 20 as the air intake valve 28 opens and closes the air inlet port 56, for that period of time during which both the rotary valve 20 and the air intake valve 28 are in open position, the air will flow into the combustion chamber 23 without the pumping losses customarily associated with apparatus using throttling to control air flow. This is because the rotary valve 20 and air intake valve 28 can be related so that they are both completely open when air enters the engine 25. This eliminates the reduced pressures and small orifices associated with throttling apparatus and makes the quantity of air taken into the combustion chamber 23 of an engine 25 a function of the length of time, as measured by piston motion, that the rotary valves 20 and the air intake valves 28 are simultaneously in open positions.

The manner in which the air control apparatus of the invention is mounted on a conventional four stroke cycle engine 25 varies with the particular design of the four stroke cycle engine 25. However, since the apparatus of the invention replaces the conventional and well known intake manifold usually used with a four stroke cycle engine, the apparatus is most easily mounted on an engine 25 in a position similar to that position which would be occupied by an intake manifold if one were used with the engine 25.

Similarly, the manner in which the rotary valves 20 are positioned for rotational motion and the manner in which the rotation of the rotary valves 20 is related to the opening and closing of the air intake valves 28 of an engine 25 vary from one engine 25 to another and from one application of the invention to another. However, the modifications within the scope of the invention which are necessary to adapt the invention to a wide variety of four stroke cycle engine types and applications of the invention will be apparent from the specific embodiment of the invention chosen by way of illustration herein.

In the specific embodiment of the invention disclosed herein, a mounting block 33 is positioned along one side of the cylinder block 32 of a conventional four stroke cycle engine 25 of known type. The mounting block 33 is positioned over the exterior entry ports 21 of the air inlet passages 22 of the engine 25. This places the mounting block 33 in the position which is usually occupied by an intake manifold and any suitable means such as welding is used to fixedly position the mounting block 33 with respect to the cylinder block. The mounting block 33 has a plurality of extension passages 34 extending through it. Each extension passage 34 registers at one end with the exterior entry port 21 of one of the plurality of the air inlet passages 22 of the engine. At its other end, each extension passage 34 terminates at one of a plurality of extension ports 35 arranged along the length of a cylindrical recess 36 extending the length of the mounting block 33.

Integral with or fixedly attached to one end of the mounting block 33 is a first axle support plate 37 and integral with or fixedly attached to the other end of the mounting block 33 is a second axle support plate 38. A valve axle 39 extends between the first axle support plate 37 and the second axle support plate 38. The centerline of the valve axle 39 coincides with the center of curvature of the cylindrical recess 36 in the mounting block 33 and the valve axle 39 is freely rotatable about its center line.

Positioned along the length of the valve axle 39 between the axle support plates 37 and 38 are a plurality of rotary valves 20. Sides 100 and 101 integral with the mounting block 33 serve with the support plates 37 and 38 to enclose the rotary valves 20 in a box-like structure. Each rotary valve 20 has a cylindrical exterior surface 27 having a radius of curvature substantially equal to the radius of curvature of the cylindrical recess 36 in the mounting block 33. That end of the axle 39 extending through and beyond the second axle support plate 38 extends into a differential gear housing 40. The differential gear housing 40 is positioned between the second axle support plate 38 and a support bracket 41 fixedly mounted on the engine 25 by welding or other known means.

Rotatably extending through the support bracket 41 and into the differential gear housing 40 is a drive axle 42. The centerline of the drive axle 42 and the centerline of the valve axle 39 coincide and the drive axle 42 has a pulley 47 fixedly mounted at that end most remote from the differential gear housing 40. The differential gear housing 40 is maintained in position between the second axle support plate 38 and the support bracket 41 by the valve axle 39 and the drive axle 42 rotatably extending into it. Thus the differential gear housing 40 is freely rotatable with respect to the engine 25 as well as with respect to the valve axle 39 and the drive axle 42.

That end of the valve axle 39 within the differential gear housing 40 has a first ring gear 43 fixedly mounted on it and that end of the drive axle 42 within the differential gear housing 40 has a second ring gear 44 fixedly mounted on it. The ring gears 43 and 44 are joined within the differential gear housing 40 by a pinion 45 which rotates about a pin 46 fixedly positioned within and movable with the differential gear housing 40. The result of this arrangement is that rotation of the drive axle 42 causes rotation of the valve axle 39 and that rotational motion of the differential gear housing 40 causes a change in relative rotational position or a phase shift between the valve axle 39 and the drive axle 42 if the rotational speed of the drive axle 42 remains constant while the differential gear housing 40 is rotated.

In the specific embodiment of the invention described herein, the pulley 47 is connected by a non-slip timing belt 48 of known type in known manner to a pulley 49 mounted on or driven by the crankshaft 50 of the engine 25. The sizes of the pulleys 47 and 49 and of the ring gears 43 and 44 are selected in known manner so that as the crankshaft 50 of the engine 25 rotates twice, the pulley 47 rotates once. The result of this arrangement is that the valve axle 39 and the rotary valves 20 rotate one complete revolution each time the crankshaft 50 of the engine 25 turns two complete revolutions. The relationship between the rotational position of the engine 25 and the rotational position of the rotary valves 20 is varied by changing the rotational position of the differential gear housing 40.

The partial exterior surface 27 of each rotary valve 20 is bounded by a leading edge 51 and a trailing edge 52. The leading edge 51 and trailing edge 52 of each rotary valve 20 are parallel to the axis of rotation of the rotary valve 20 and the angular length of the gap 53 between the edges 51 and 52 is less than the angular length of the exterior surface 27 between the edges 51 and 52.

Each rotary valve 20 has a plurality of spokes 54 extending between its exterior surface 27 and the hub 55 through which the valve axle 39 extends and each rotary valve 20 is open at both ends. Moreover, each rotary valve 20 is spaced apart from the rotary valve 20 adjacent to it on the valve axle 39. The result of this arrangement is that a rotary valve 20 closes the extension port 35 of an extension passage 34 only when the rotational position of the rotary valve 20 places its exterior surface 27 over the extension port 35. When the rotational position of a rotary valve 20 places an extension port 35 in the gap 53 between the edges 51 and 52, the construction and spacing of the rotary valves 20 permit air to freely enter the extension passage 24 with which the particular rotary valve 20 is associated.

The exterior surface 27 of each rotary valve 20 is thickened adjacent to the edges 51 and 52 to strengthen the exterior surface 27 adjacent to the gap 53 and to balance the weight of the rotary valve about its axis of rotation. In addition, the rotational positions of the rotary valves 20 with respect to each other on the valve axle 39 are selected in accordance with the known firing order of the plurality of cylinders 24 of the engine 25 so that all rotary valves 20 are related in the same manner to the four strokes of the pistons 31 in the cylinders 24.

The opening and closing of the air inlet ports 56 of an engine 25 by the air intake valves 28 is directly related in known manner to the rotational position of the crankshaft 50. Depending upon the firing order of the cylinders 25, a particular rotational position of the crankshaft 50 will cause a particular air intake valve 28 to open an air inlet port 56. The air inlet port 56 remains open while the crankshaft 50 rotates to a new position which causes the particular air intake valve 28 to close the air inlet port 56. Thus, for each engine 25, there is a particular portion of the rotational motion of the crankshaft 50 during which each of the plurality of air intake valves 28 opens the air inlet port 56 with which it is associated.

The length of the gap 53 between the edges 51 and 52 of the rotary valves 20 is an angular distance slightly greater than the angular distance rotated by the valve axle 39 as the crankshaft 50 rotates the particular portion of its rotational motion required to open and close an air inlet port 56. Each rotary valve 20 is fixedly positioned on the valve axle 39 in that position with respect to the other rotary valves 20 which will cause the leading edges 51 of all rotary valves 20 to start passing over the extension port 35 which each rotary valve 20 opens and closes when the piston 31 in the cylinder 24 to which the extension port 35 leads is in a particular selected position. Since the rotational position of the crankshaft 50 determines when each of the plurality of pistons 31 is in the selected position, this positioning of the rotary valves 20 with respect to each other on the valve axle 39 is simply a matter of relating the positions of the rotary valves to the rotation of the crankshaft 50 and the firing order of the engine 25.

However, as already stated, the differential gear housing 40 permits the rotational position of the valve axle 39 with respect to the rotational position of the crankshaft 50 to be varied. Thus, rotation of the differential gear housing 40 changes the particular selected position of pistons 31 at which the leading edges 51 of the rotary valves 20 start passing over the extension port 35 which each rotary valve 20 opens and closes. It is by rotating the differential gear housing 40 that the relationship between the plurality of rotary valves 20 and the air intake valves 28 is varied to control the air entering the combustion chambers 23 of an engine 26.

The position of the differential gear housing 40 is changed as the power demands on the engine 25 change. In the specific embodiment of the invention shown in the figures, this change in differential gear housing 40 position is accomplished by a lever 57 movable by the operator of the engine 25. As the lever 57 is moved by the operator of the engine 25, the differential gear housing 40 is moved from its full power position to a plurality of reduced power positions.

When the differential gear housing 40 is in its full power position, the relationship between the rotational position of the valve axle 39 and the rotational position of the crankshaft 50 is such that the particular position of the pistons 31 at which the leading edges 51 of the rotary valves 20 start moving across the extension ports 35 is that position just before the piston 31 position at which the air intake valve 28 opens the air inlet port 56. The rotary valves 20 are rotated by the pulley 47 so that the leading edge 51, the gap 53, and trailing edge 52 pass in that order over the extension ports 35 and this relationship between valve axle 39 and crankshaft 50 rotation and the length of the gap 53 causes the extension ports 35 to be open when the air intake valves 28 open the air inlet ports 56, while the air inlet ports 56 are open, and when the air intake valves 28 close the air inlet ports 56. Thus, air flows in an obstructed manner and at atmospheric pressure into the combustion chambers 23 of the engine.

When the lever 57 is moved and the differential gear housing 40 is rotated from its full power position, the relationship between the rotational position of the valve axle 39 and the rotational position of the crankshaft 50 is changed so that the position of the pistons 31 at which the leading edges 51 of the rotary valve 20 start moving across the extension ports 35 is earlier in the cycle of each piston 31 than when the differential gear housing 40 is in full power position. This means that the degree or amount of crankshaft 50 rotation between the opening of each extension port 35 and the opening of each related air inlet port 56 is increased. Thus, when an air inlet port 56 is opened by an air intake valve 28, the extension port 35 is already open as is the case when the differential gear housing 40 is in full power position.

However, the extension ports 35 and the air inlet ports 56 remain open for fixed amounts of crankshaft 50 rotation and the sooner each extension port 35 opens with respect to the opening of the air inlet port 56 associated with it, the sooner the extension port 35 must close with respect to the closing of the air inlet port 56 associated with it. Thus, when the differential gear housing 40 is moved from full power position, the extension ports 35 close before the air inlet ports 56. This results in the portion of the crankshaft 50 rotation during which both an extension port 35 and the air inlet port 56 associated with it are open being reduced.

The air inlet ports 56 are opened by the air intake valves 28 near the start of the intake strokes of the pistons 31 and the air inlet ports 56 are closed by the air intake valves 28 near the end of the intake strokes of the pistons 31. When the differential gear housing 40 is in full power position, the free flow of air into the combustion chambers 23 of the cylinders 24 throughout the period that the air intake valves 28 are in open position results in the quantity of air taken into each combustion chamber 23 being substantially equal to the volume of the combustion chambers 23 when the pistons 31 have completed their intake strokes.

However, when the differential gear housing 40 is not in full power position and the extension ports 35 are closed before the air inlet ports 56, the entry of air into the combustion chambers 23 of the engine 25 is stopped before the pistons 31 complete their intake strokes. As a result, the quantity of air taken into each combustion chamber 23 is defined and limited by the size of the combustion chambers 23 before the pistons 31 have completed their intake strokes. The sooner an extension port 35 is closed during the intake stroke of a piston, the smaller the size of the combustion chamber 23 and the quantity of air taken into the cylinder 25.

Except for that brief moment that the trailing edge 52 of a rotary valve 20 is closing an extension port 35 while the air inlet port 56 is still open associated with positions of the differential gear housing 40 other than its full power position, the extension ports 35 are completely open when the air inlet ports 56 open in known manner and remain completely open until either the air inlet ports 56 or the extension ports 35 close to control the quantity of air entering the combustion chambers 23 of the engine 25. Thus, whenever both the extension ports 35 and the air inlet ports 56 are open, air freely enters the combustion chambers 23 through the extension ports 35.

Motion of the lever 57 reduces the quantity of air entering the combustion chambers 23 of the engine 25 in the manner described and in the specific embodiment of the invention shown in the figures, the motion of the lever 57 also controls the fuel injected into the combustion chambers 23 of the engine 25. Thus, the motion of a single lever 57 causes a reduction in both the air and fuel required to maintain a proper air fuel ratio as the quantity of the combustible mixture used by an engine 25 decreases with decreased power demands on the engine 25.

In the specific embodiment of the invention described herein, the fuel is injected into the combustion chambers 23 of the engine 25 by a fuel injector 60 of known type having a pulley 61 which is also driven by the belt 48. The fuel injector 60 injects fuel in known manner into the combustion chambers 23 of the engine 25 through injection nozzles 62 of known type and to which the fuel injector 60 is connected in known manner by tubing (not shown) or other means.

The quantity of fuel injected into each combustion chamber 23 of the engine 25 by the fuel injector 60 is varied by motion of a lever arm 65. Motion of the lever arm 65 varies the quantity of fuel injected by the fuel injector 60 into the combustion chambers 23 in the usual known manner and the lever arm 65 is moved by the lever 57 by extending a connector arm 68 from the lever 57 to a cam block 69 which controls the motion of the lever arm 65. The cam block 69 is fixedly attached to one end of the connector arm 68 and is mounted in any suitable manner (not shown) for slidable motion adjacent to the lever arm 65. The connector arm 68 is pivotally attached to the lever 57 and motion of the lever 57 to change the quantity of air taken into the combustion chambers 23 of the engine 25 slidably moves the cam block 69.

The cam block 69 engages a cam follower 70 formed at the extending end of the lever arm 65 and the cam surface 71 of the cam block 69 is shaped in known manner so that a particular position of the lever 57 will result in that position of the lever arm 65 required to cause the fuel injector 60 to inject the quantity of fuel which it is desired to mix with the quantity of air associated with the particular position of the lever 57. The exact shape of the cam surface 71 will depend upon the known characteristics of the fuel injector 60. Moreover, when these characteristics of the fuel injector 60 are known, the cam surface 71 may be shaped to maintain a constant air-fuel ratio or to vary the air-fuel ratio over the operating range of the engine.

It has been found that the control of the air entering the combustion chambers 23 of an engine 25 by rotary valves 20 in the manner described will in some applications cause an idling engine to stall. This is because the positive and highly desirable control of air provided by the air control apparatus prevents the necessary increase in air when the torque on an idling engine 25 is increased. The increase in torque reduces engine speed and it is well known that stalling of an idling engine can be prevented only if additional air can be obtained by the engine 25. The air control apparatus can be adapted to those applications where the engine 25 will be subjected to the increased torques while idling and where the high temperatures in the air inlet passages 22 known to be present at low power and low engine speeds present a problem by extending a bleed air passage 80 through the mounting block 33 to each extension passage 34. The bleed air passages 80 are sufficiently small to not significantly alter the operation of the air control apparatus described above and are sufficiently large to permit the entry into each cylinder 24 of that additional air which is necessary to prevent stalling of an engine 25 at low engine speeds and to prevent the air in the air inlet passages 22 from becoming excessively hot.

The air control apparatus has been described in detail herein as controlling the air taken into combustion chambers 23 into which fuel is independently injected by a fuel injector 60 or other means. However, the air control apparatus may also be used to control the entry of a mixture of air and fuel into the combustion chambers 23 of an engine 25. This application of the air control apparatus is shown in FIGURE 7 where it is used to control the entry of a combustible mixture of air and fuel into the combustion chambers 23' of an engine 25' from a manifold 91. The air-fuel mixture is mixed in the manifold 91 or before it enters the manifold 91 and the quantity of the combustible mixture entering the combustion chambers 23' is controlled in same manner as described above for the control of air alone. Thus, the specific structural details of the modification of the air control apparatus shown in FIGURE 7 will be easily understood from what has been said above. Regardless of modification, the air control apparatus disclosed herein eliminates pumping losses and significantly contributes to the efficient performance of an engine under a wide range of operating conditions.

It will be obvious that many variations may be made in the embodiment here chosen for the purpose of illustrating the present invention without departing from the scope thereof as defined by the appended claims.

What is claimed as invention is:

1. The combination with an internal combustion engine having a rotating crankshaft, a combustion chamber, an air inlet passage for admitting air into the combustion chamber, and an air intake valve for opening and closing the air inlet passage at particular rotational positions of the crankshaft of valve means responsive to crankshaft rotation for opening and closing the air inlet passage independently of the opening and closing of the air inlet passage by the air intake valve, said valve means being effectively immediately adjacent said intake valve, and of control means for varying the rotational positions of the crankshaft at which the valve means opens and closes the air inlet passage.

2. The combination with an internal combustion engine having a combustion chamber, a piston movable in said combustion chamber, an air inlet passage for admitting a mixture of fuel and air into the combustion chamber, and an air intake valve for opening and closing the air inlet passage when the piston is at particular positions in the combustion chamber of valve means responsive to piston position for opening and closing the air inlet passage independently of the opening and closing of the air inlet passage by the air intake valve, said valve means being effective immediately adjacent said intake valve, and of control means for varying the positions of the piston at which the valve means opens and closes the air inlet passage.

3. An apparatus for controlling the air taken into the plurality of combustion chambers of a four-stroke cycle engine, said engine having a cylinder block, a rotating crankshaft, fuel means for admitting fuel into each of the plurality of combustion chambers of the engine in response to changes in engine operating conditions, control means for controlling said fuel means, a plurality of air inlet passages with each air inlet passage extending through the cylinder block from one of the plurality of combustion chambers, and a plurality of air intake valves with each air intake valve opening one of the plurality air inlet passages when the crankshaft is in a first rotational position and closing the said air inlet passage when the crankshaft is in a second rotational position, and said apparatus comprising, in combination, a mounting block fixedly positioned adjacent to the cylinder block of the engine, said mounting block having a curved channel extending its length, having a plurality of extension passages with each extension passage joining one of a plurality of extension ports distributed along the length of the channel and one of the plurality of air inlet passages, and having a plurality of bleed air passages with each bleed air passage extending through the mounting block from one of the plurality of extension passages; a first axle support fixedly positioned on the mounting block; a second axle support fixedly positioned on the mounting block; a valve axle rotatably extending from the first axle support to and through the second axle support, said valve axle having an axis of rotation which coincides with the center of curvature of the said curved channel; a support bracket fixedly positioned adjacent to the engine parallel to and spaced apart from the second axle suport; a drive axle rotatably extending through the support bracket with its axis of rotation coinciding with the axis of rotation of the valve axle; a gear housing positioned between the second axle support and the support bracket, said gear housing enclosing and being rotatable about the extending end of the valve axle and the extending end of the drive axle; a first ring gear mounted on the valve axle within the gear housing; a second ring gear mounted on the drive axle within the gear housing; a pinion gear engaging the first ring gear and the second ring gear and rotatable with the gear housing about the valve axle and the drive axle; a plurality of rotary valves, each rotary valve having an exterior surface which has substantially the same radius of curvature as the said curved channel in the mounting block and which has a gap in it between a leading edge and a trailing edge, each rotary valve being positioned along the length of the valve axle so that its exterior surface closes one of the plurality of extension ports, and each rotary valve being in that rotational position on the valve axle which places its leading edge over the extension port which its exterior surface closes when an air intake valve closes the air inlet passage joined to the said extension port by an extension passage; means responsive to the rotational position of the crankshaft for rotating the drive axle at that speed which places the gap of a rotary valve over an extension port while the crankshaft rotates between a said first rotational position and a said second rotational position; and means responsive to said control means for rotating the gear housing and varying the rotational relationship between the drive axle and the valve axle.

4. An apparatus for controlling the air taken into the plurality of combustion chambers of a four-stroke cycle engine, said engine having a cylinder block, a rotating crankshaft, fuel means for admitting fuel into each of the plurality of combustion chambers of the engine in response to changes in engine operating conditions, control means for controlling said fuel means, a plurality of air inlet passages with each air inlet passage extending through the cylinder block from one of the plurality of combustion chambers, and a plurality of air intake valves with each air intake valve opening one of the plurality of air inlet passages when the crankshaft is in a first rotational position and closing the said air inlet passage when the crankshaft is in a second rotational position, and said apparatus comprising, in combination, a mounting block fixedly positioned adjacent to the cylinder block of the engine, said mounting block having a curved channel extending its length and having a plurality of extension passages with each extension passage joining one of a plurality of extension ports distributed along the length of the channel and one of the plurality of air inlet passages; a first axle support fixedly positioned on the mounting block; a second axle support fixedly positioned on the mounting block; a valve axle rotatably extending from the first axle support to and through the second axle support, said valve axle having an axis of rotation which coincides with the center of curvature of the said curved channel; a support bracket fixedly positioned adjacent to the engine parallel to and spaced apart from the second axle support; a drive axle rotatably extending through the support bracket with its axis of rotation coinciding with the axis of rotation of the valve axle; a gear housing positioned between the second axle support and the support bracket, said gear housing enclosing and being rotatable about the extending end of the valve axle and the extending end of the drive axle; a first ring gear mounted on the valve axle within the gear housing; a second ring gear mounted on the drive axle within the gear housing; a pinion gear engaging the first ring gear and the second ring gear and rotatable with the gear housing about the valve axle and the drive axle; a plurality of rotary valves, each rotary valve having an exterior surface which has substantially the same radius of curvature as the said curved channel in the mounting block and which has a gap in it between a leading edge and a trailing edge, each rotary valve being positioned along the length of the valve axle so that its exterior surface closes one of the plurality of extension ports, and each rotary valve being in that rotational position on the valve axle which places its leading edge over the extension port which its exterior surface closes when an air intake valve closes the air inlet passage joined to the said extension port by an extension passage; means responsive to the rotational position of the crankshaft for rotating the drive axle at that speed which places the gap of a rotary valve over an extension port while the crankshaft rotates between a said first rotational position and a said second rotational position; and means responsive to said control means for rotating the gear housing and varying the rotational relationship between the drive axle and the valve axle.

5. An apparatus for controlling the air taken into the combustion chamber of a four-stroke cycle engine, said engine having a cylinder block, a rotating crankshaft, fuel means for admitting fuel into the combustion chamber of the engine in response to changes in engine operating conditions, control means for controlling said fuel means, an air inlet passage extending through the cylinder block from the combustion chamber, and an air intake valve opening the air inlet passage when the crankshaft is in a first rotational position and closing the said air inlet passage when the crankshaft is in a second rotational position, and said apparatus comprising, in combination, a mounting block fixedly positioned adjacent to the cylinder block of the engine, said mounting block having a curved channel, an extension passage joining an extension port in the channel and the air inlet passage of the engine, and a bleed air passage extending through the mounting block from the extension passage; a first axle support fixedly positioned on the mounting block; a second axle support fixedly positioned on the mounting block; a valve axle rotatably extending from the first axle support to and through the second axle support, said axle having an axis of rotation which coincides with the center of curvature of the said curved channel; a support bracket fixedly positioned adjacent to the engine parallel to and spaced apart from the second axle support; a drive axle rotatably extending through the support bracket with its axis of rotation coinciding with the axis of rotation of the valve axle; a gear housing positioned between the second axle support and the support bracket, said gear housing enclosing and being rotatable about the extending end of the valve axle and the extending end of the drive axle; a first ring gear mounted on the valve axle within the gear housing; a second ring gear mounted on the drive axle within the gear housing; a pinion gear engaging the first ring gear and the second ring gear and rotatable with the gear housing about the valve axle and the drive axle; a rotary valve having an exterior surface which has substantially the same radius of curvature as the said curved channel in the mounting block and which has a gap in it between a leading edge and a trailing edge, said rotary valve being positioned on the valve axle so that its exterior surface closes the extension port; means responsive to the rotational position of the crankshaft for rotating the drive axle at that speed which places the gap of the rotary valve over the extension port while the crankshaft rotates between the said first rotational position and the said second rotational position; and means responsive to said control means for rotating the gear housing and varying the rotational relationship between the drive axle and the valve axle.

6. An apparatus for controlling the air taken into the combustion chamber of a four-stroke cycle engine, said engine having a rotating crankshaft, fuel means for admitting fuel into the combustion chamber of the engine in response to changes in engine operating conditions, control means for controlling said fuel means, an air inlet passage extending through the cylinder block from the combustion chamber, and an air intake valve opening the air inlet passage when the crankshaft is in a first rotational position and closing the said air inlet passage when the crankshaft is in a second rotational position, and said apparatus comprising, in combination, a rotatable rotary valve having an exterior surface with a gap in it, said rotary valve being positioned so that its exterior surface closes the air inlet passage of the engine and the gap in its exterior surface opens the air inlet passage of the engine; means responsive to the rotational position of the crankshaft for rotating the rotary valve at that speed which places the gap of the rotary valve over the air inlet passage while the crankshaft rotates between the said first rotational position and the said second rotational position; and means responsive to said control means for varying the rotational relationship between the rotary valve and the crankshaft.

7. Apparatus for controlling air taken into the combustion chamber of a four-stroke cycle engine to be mixed with a predetermined amount of fuel, thereby to control the fuel/air ratio of the engine, said engine having an intake passage connected to said combustion chamber, an intake valve between said combustion chamber and said intake passage for causing selective communication between said intake passage and said combustion chamber, said intake valve being opened and closed in response to rotational position of a crank shaft, said apparatus including a rotary valve in said intake passage and effective immediately adjacent said intake valve, said rotary valve being operated in response to rotation of said crank shaft independently of said intake valve and being so constructed and arranged that, when said rotary valve is closed, sufficiently little air is retained between said rotary valve and said intake valve to maintain a fixed fuel/air ratio within said combustion chamber.

References Cited by the Examiner

UNITED STATES PATENTS

| 1,450,250 | 4/23 | Cole | 123—119 |
| 1,758,429 | 5/30 | Cory | 123—75 |
| 2,110,754 | 3/38 | Alston | 123—75 |

FOREIGN PATENTS

| 14,359 | 6/03 | Great Britain. |
| 178,645 | 10/35 | Switzerland. |

SAMUEL LEVINE, *Primary Examiner.*

FRED E. ENGELTHALER, *Examiner.*